United States Patent [19]

Higgins, Jr.

[11] Patent Number: 4,675,960
[45] Date of Patent: Jun. 30, 1987

[54] METHOD OF MANUFACTURING AN ELECTRICALLY VARIABLE PIEZOELECTRIC HYBRID CAPACITOR

[75] Inventor: Robert J. Higgins, Jr., Sunrise, Fla.

[73] Assignee: Motorola, Inc., Schaumburg, Ill.

[21] Appl. No.: 814,868

[22] Filed: Dec. 30, 1985

[51] Int. Cl.[4] .................... H01L 41/22; H01G 7/00
[52] U.S. Cl. ............................... 29/25.35; 29/25.41;
       310/338; 361/277; 361/281; 361/283
[58] Field of Search ................... 29/25.35, 25.41;
       310/338; 361/277, 281, 283

[56] References Cited

U.S. PATENT DOCUMENTS

| | | |
|---|---|---|
| 2,243,921 | 6/1941 | Rust et al. |
| 2,321,285 | 6/1943 | Ehret et al. |
| 2,368,643 | 2/1945 | Crosby |
| 2,633,543 | 3/1953 | Howatt |
| 2,677,799 | 5/1954 | Foster et al. |
| 3,646,413 | 2/1972 | Oomen |
| 3,949,246 | 4/1976 | Lohrmann |
| 4,426,406 | 1/1984 | Brooks et al. ............ 29/25.41 X |
| 4,467,394 | 8/1984 | Grantham et al. ............ 361/283 |
| 4,490,772 | 12/1984 | Blickstein |
| 4,530,029 | 7/1985 | Beristain ............ 361/283 |

Primary Examiner—Carl E. Hall
Attorney, Agent, or Firm—Martin J. McKinley; Daniel K. Nichols; Joseph T. Downey

[57] ABSTRACT

An electrically variable three terminal monomorphic piezoelectric capacitor is manufactured with thick or thin film hybrid microelectronic circuit technology. A first capacitor plate and a ridge, which substantially surrounds and extends above the first capacitor plate, are formed on the surface of a substrate. A monomorphic piezoelectric wafer having a control plate and a second capacitor plate on opposing surfaces is bonded to the upper surface of the ridge. During bonding, a force is applied at the center of the wafer which fixes a permanent bow in the wafer in the direction of the first capacitor plate. A four terminal monomorphic embodiment and three and four terminal bimorphic embodiments are also described.

9 Claims, 9 Drawing Figures

METHOD OF MANUFACTURING AN ELECTRICALLY VARIABLE PIEZOELECTRIC HYBRID CAPACITOR

BACKGROUND OF THE INVENTION

This invention relates to the field of electrical capacitors and more particularly to electrically variable piezoelectric capacitors manufacturable on thick or thin film hybrid microelectronic circuit substrates.

Hybrid microelectronic circuits are typically manufactured using either a thick film or a thin film process. In this thick film process, conductors, resistors, dielectrics, and insulators are silk screened onto a thin ceramic substrate, dried, and fired. Solder paste is then screened on at appropriate locations and discrete parts are attached to the substrate by heating the substrate and reflowing the solder. In the thin film process conductors are formed by applying a conductive material to the substrate surface and then etching the surface at predetermined locations using a photolithgraphic process. When a particular circuit, such as a voltage controlled oscillator, requires an electrically variable capacitor, a varactor diode is normally used because of its small size and ease of attachment to a hybrid microelectronic circuit substrate.

Varactor diodes have disadvantages, however, the most significant is their nonlinear voltage-capacitance response. It is a well known principle that nonlinear devices generate harmonic frequencies. In radio circuits, where the spectral purity of the transmitted signal is extremely important, any nonlinear device can generate unwanted harmonics which can be unintentionallly amplified and transmitted. Thus, when varactor diodes are used in radio circuits, extreme care must be taken to insure that any harmonic frequencies that they generate are not radiated.

Another disadvantage of varactor diodes and other nonlinear capacitors is that they are two terminal devices. Therefore, the capacitance control voltage and the signal voltage cannot be separate and isolated voltages, but must be applied across the same two terminals. Therefore, the signal voltage must be combined with the control voltage.

Electrically variable capacitors have also been manufactured from piezoelectric elements. A typical prior art piezoelectric variable capacitor includes two bimorph piezoelectric elements. Each element includes two piezoelectric layers of different polarizations bonded together with a conductive control plate in between the layers. One surface of each element has a conductive control plate while the other surface has a centrally located capacitor plate with a lead extending to the edge of the element. Each capacitor plate is surrounded by a narrow insulating area which in turn is surrounded by another control plate. The two elements are then bonded together at their capacitor plate surfaces. A control voltage, appropriately applied to the various control plates, causes the elements to flex at their centers, thereby moving the two capacitor plates further apart and varying the capacitance accordingly.

Although electrically variable piezoelectric capacitors are more linear than varactor diodes, the prior art piezoelectric capacitor is not well suited for either attachment to a hybrid microelectronic circuit substrate or for manufacturing using existing hybrid microelectronic circuit manufacturing technology.

SUMMARY OF THE INVENTION

An object of the present invention is to provide an improved electrically variable piezoelectric capacitor.

A more specific object of the present invention is to provide an electrically variable piezoelectric capacitor that can be manufactured on hybrid microelectronic circuit substrates using existing hybrid microelectronic circuit manufacturing technology.

Briefly, in one embodiment of the invention, a method of constructing an electrically variable piezoelectric hybrid microelectronic circuit capacitor includes forming a first capacitor plate on one surface of a substrate. Using a hybrid microelectronic circuit manufacturing process, a ridge is then formed on the same surface of the substrate with the upper surface of the ridge being a predetermined distance above the first capacitor plate. A second capacitor plate and a first control plate are then respectively formed on first and second surfaces of a piezoelectric wafer. The piezoelectric wafer is then attached to the ridge.

In another embodiment, an electrically variable piezoelectric hybrid microelectronic circuit capacitor includes a substrate with a first capacitor plate and a ridge formed on one surface of the substrate. The ridge, which is formed by a hybrid microelectronic circuit manufacturing process, has an upper surface which is a predetermined distance above the first capacitor plate. A piezoelectric wafer is connected to the upper surface of the ridge. A second capacitor plate and a first control plate are respectively formed on the first and second surfaces of the piezoelectric wafer.

In still another embodiment, an electrically variable piezoelectric hybrid microelectronic circuit capacitor includes a ceramic substrate with a first capacitor plate and a substantially circular supporting ridge formed on one surface of the ceramic substrate. The ridge, which is formed by a hybrid microelectronic circuit manufacturing process, has an upper surface positioned a predetermined distance above the first capacitor plate. A substantially dome shaped piezoelectric wafer, which has a convex surface adjacent the first capacitor plate and an opposing concave surface, is connected at its perimeter to the upper surface of the ridge. A second capacitor plate and a control plate are respectively formed on the convex and concave surfaces of the piezoelectric wafer. The capacitance between the first and second capacitor plates depends on the control voltage applied between the control plate and the second capacitor plate.

DESCRIPTION OF THE PREFERRED EMBODIMENTS

Figure 1:
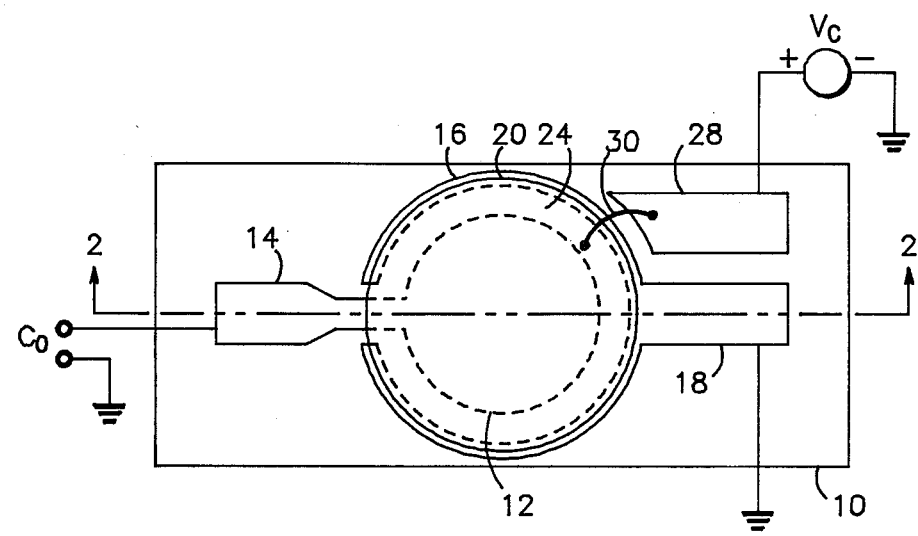
FIG. 1 is a top view of the preferred three terminal monomorphic embodiment of the present invention wherein the capacitance control voltage $V_c$ and the output capacitance $C_o$ are illustrated schematically.
Figure 2:
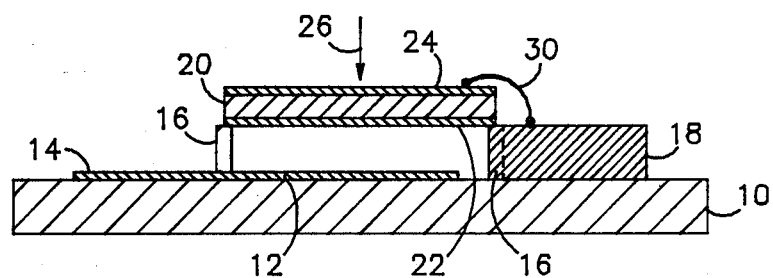
FIG. 2 is a sectional view of the preferred three terminal monomorphic embodiment as seen along line 2—2 of FIG. 1.

FIGS. 1 and 2 illustrate the preferred three terminal monomorphic embodiment of the present invention. A hybrid microelectronic circuit substrate 10 is preferably made from a ceramic material, such as alumina, although any well known material compatible with hybrid microelectric circuit manufacturing processes is suitable. A first capacitor plate 12, having an attached terminal 14, is formed on one surface of substrate 10 by a well known hybrid microelectronic circuit manufacturing process for forming conductive layers. Such well known processes include silk screening for thick film circuits and sputtering, vacuum deposition, or electroplating for thin film circuits. The preferred thickness for first capacitor plate 12 and terminal 14 is 1 to 2 mils.

A ridge 16, having an attached terminal 18, is also formed on the surface of substrate 10 by a well known hybrid microelectronic circuit manufacturing process. In addition to the aforementioned processes for forming conductive layers, ridge 16 can also be formed by tooling substrate 10. For example, ridge 16 can be formed by a tool die when the alumina substrate 10 is "green". After firing, ridge 16 and terminal 18 would then be permanently formed on the surface of substrate 10. Ridge 16 and terminal 18 can also be comprised of a preformed glass ring epoxy bonded to the surface of substrate 10. If ridge 16 is tooled or preformed glass, a conductive surface can then be applied to its upper surface by one of the aformentioned processes for forming conductive layers. This conductive surface on ridge 16 and terminal 18 is preferably applied simultaneously with first capacitor plate 12. Regardless of the process used to form ridge 16, its upper surface is always a predetermined distance above the upper surface of capacitor plate 12 and terminal 14. This distance provides for separation between the two capacitor plates and is preferably less than 1 mil, although wider capacitor plate separations are acceptable.

A well known monomorphic piezoelectric wafer 20 has a second capacitor plate 22 formed on its lower surface and a control plate 24 formed on its upper surface. Capacitor plate 22 and control plate 24 are preferably electroplated on piezoelectric wafer 20, although any hybrid microelectronic circuit process for forming conductive layers is suitable. Piezoelectric wafer 20 is bonded to ridge 16 at capacitor plate 22, preferably by soldering, however other well known methods of providing a conductive bond, such as conductive epoxy, are suitable. Prior to bonding, a force 26 is applied substantially in the center of piezoelectric wafer 20 causing the wafer to arch downward slightly. Although the amount of the force will depend on the particular piezoelectric wafer used, it should be sufficient to produce about a ½ mil deflection at the center of wafer 20. After bonding wafer 20 to ridge 16, force 26 is removed and wafer 20 will maintain a slight arched or domed shape, curving in the direction of first capacitor plate 12. Fixing a slight but permanent arch into wafer 20 is necessary to predispose wafer 20 to flex downwards towards first capacitor plate 12 when a control voltage is applied between control plate 24 and second capacitor plate 22. Without this predisposition to move downward, monomorphic piezoelectric wafer 20 would have an equal probability of flexing away from first capacitor plate 12 when the control voltage $V_c$ is applied.

Capacitance control terminal 28 is formed on the surface of substrate 10, preferably at the same time, to the same thickness, and by the same process that first capacitor plate 12 and terminal 18 are formed. Flywire 30 interconnects control plate 24 with control terminal 28. Flywire 30 is preferably connected to control plate 24 and terminal 28 by soldering, although other well known methods such as compression bonding or conductive epoxy are suitable.

In operation, a control voltage $V_c$ are applied between terminals 28 and 18 and the variable capacitance $C_o$ appears across terminals 14 and 18. Although terminal 18 is shown symbolically at ground potential it can conceivably be any voltage. When the control voltage is increased, the piezoelectric wafer 20 attempts to expand, however, its expansion is confined by ridge 16, therefore, the wafer bulges in its predisposed direction towards first capacitor plate 12. As piezoelectric wafer 20 arches towards first capacitor plate 12, the distance between capacitor plates 12 and 22 decreases, thereby increasing the capacitance across terminals 14 and 18.

Figure 3:
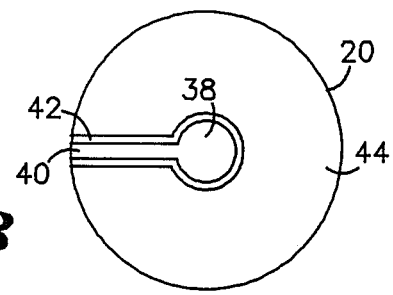
FIG. 3 is a bottom view of the preferred piezoelectric element as used in the four terminal embodiments of FIGS. 4-5 and 8-9.

The three terminal monomorphic piezoelectric capacitor of FIGS. 1 and 2 can be converted into a four terminal capacitor by constructing the bottom surface of piezoelectric wafer 20 as illustrated in FIG. 3. A second capacitor plate 38 is smaller than capacitor plate 22 of FIG. 1, it is also centrally located and has a lead 40 extending to the edge of wafer 20. Capacitor plate 38 and lead 40 are surrounded by an insulating area 42 which in turn is surrounded by a second control plate 44.

Figure 4:
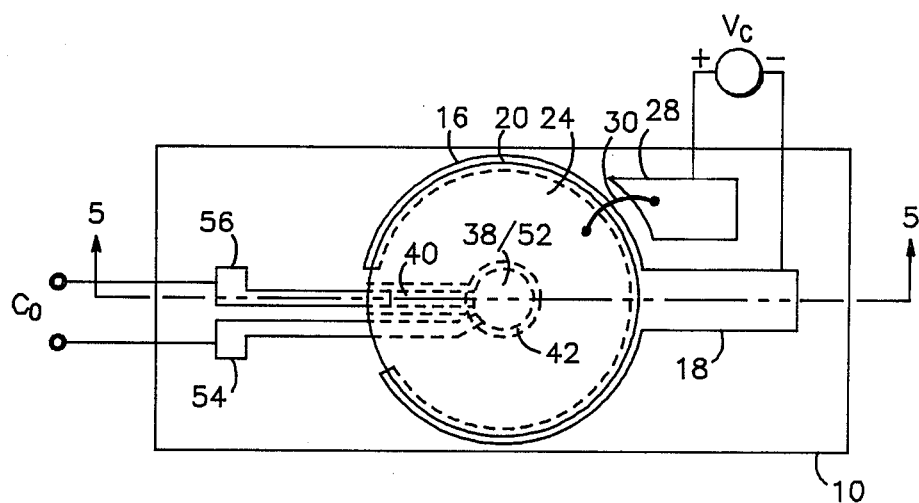
FIG. 4 is a top view of the preferred four terminal monomorphic embodiment of the present invention wherein the capacitance control voltage $V_c$ and the output capacitance $C_o$ are illustrated schematically.
Figure 5:
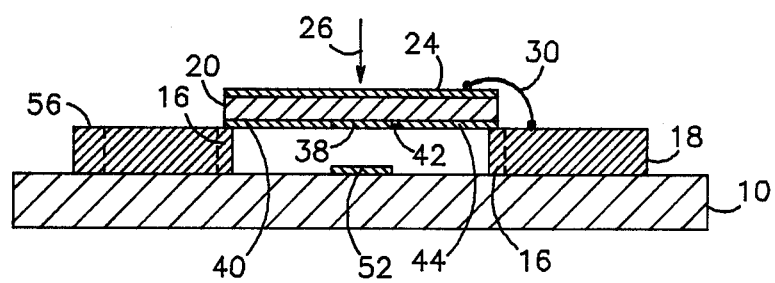
FIG. 5 is a sectional view of the preferred four terminal monomorphic embodiment as seen along line 5—5 of FIG. 4.

FIG. 4 and 5 illustrate the preferred four terminal monomorphic embodiment of the present invention. This embodiment uses the piezoelectric wafer as illustrated in FIG. 3. As before, a first capacitor plate 52, having an attached terminal 54, is formed on the surface of substrate 10 by a well known hybrid microelectronic circuit manufacturing process. First capacitor plate 52 is smaller than capacitor plate 12 of FIGS. 1 and 2 because of the reduced surface area of the opposing capacitor plate 38 on the lower surface of wafer 20. Ridge 16 with attached terminal 18 and terminal 28 are formed on the surface of substrate 10 as previously described. Also, control plate 24 is connected to terminal 28 through flywire 30 as previously described.

To connect second capacitor plate 38 to the substrate, a terminal 56 is formed on the surface of substrate 10, preferably simultaneous with and using the same process as that used to form ridge 16. Terminal 56 is formed to the same thickness as ridge 16. To attach wafer 20 to substrate 10, control plate 44 is bonded to ridge 16 and lead 40 is bonded to terminal 56 preferably by soldering, although other conductive bonding techniques well known in the art such as conductive epoxy are suitable. As before, force 26 is applied substantially at the center of wafer 20 before bonding the wafer to ridge 16 and terminal 56. Upper control plate 24 is connected to terminal 28 through flywire 30 as previously described and the control voltage $V_c$ is applied across terminals 28 and 18. In the four terminal embodiment, however, the capacitance is taken across terminals 54 and 56. It will be noted that in this embodiment that there is no common electrical connection between capacitance terminals 54 and 56 and control terminals 28 and 18.

Figure 6:
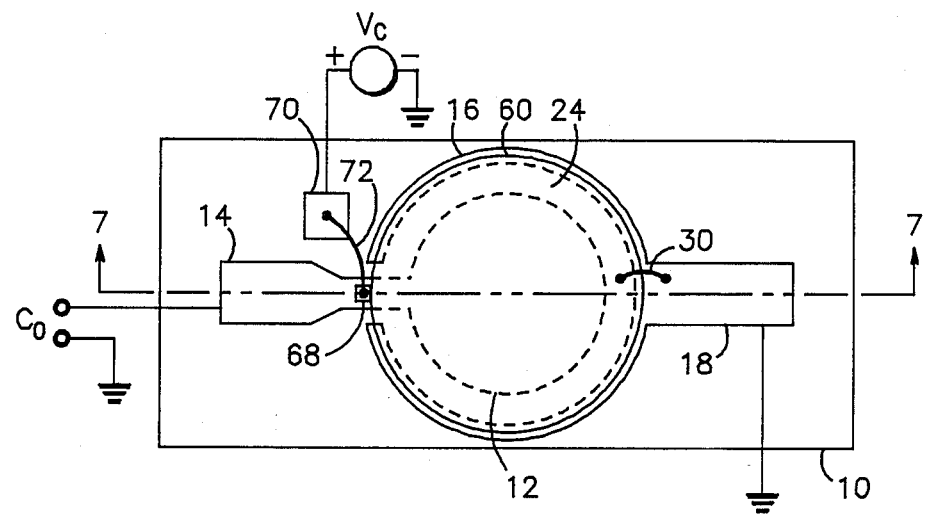
FIG. 6 is a top view of the preferred three terminal bimorphic embodiment of the present invention wherein the capacitance control voltage $V_c$ and the output capacitance $C_o$ are illustrated schematically.
Figure 7:
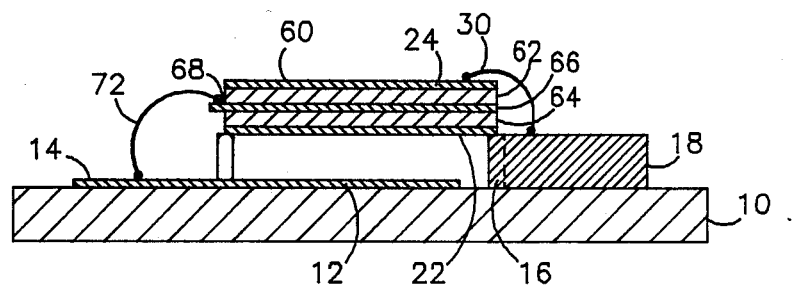
FIG. 7 is sectional view of the preferred three terminal bimorphic embodiment as seen along line 7—7 of FIG. 6.

FIGS. 6 and 7 illustrate the preferred three terminal bimorphic embodiment of the present invention. As previously described, a first capacitor plate 12 with an attached terminal 14, and a ridge 16 with an attached terminal 18 are formed on the surface of substrate 10. In this embodiment, a well known bimorph piezoelectric wafer 60 has a control plate 66 formed on the upper surface of a first piezoelectric layer 64. A second piezoelectric layer 62 is then bonded to the first layer over control plate 66. Control plate 66 has a tab 68 extending outside the perimeter of wafer 60. A control plate 24 is formed on the upper surface of piezoelctric wafer 60 and a second capacitor plate 22 is formed on its lower surface as previously described for wafer 20. Capacitor plate 22 is bonded to ridge 16, also as previously described. A terminal 70 is also formed on the surface of substrate 10 preferably simultaneous with capacitor plate 12 and a flywire 72 is connected between tab 68 and terminal 70, preferably by soldering. As previously described, flywire 80 is attached to control plate 24, however, in this embodiment the other end of the flywire is attached to terminal 18.

In operation, by applying the appropriate polarity of control voltage $V_c$ between terminals 70 and 18 piezoelectric wafer 60 can be made to flex towards first capacitor plate 12. thereby increasing the capacitance between terminals 14 and 18. By reversing the polarity of control $V_c$ voltage applied between terminals 70 and 18, piezoelectric wafer 60 can be made to flex away from first capacitor plate 12, thereby decreasing the capacitance between terminals 14 and 18.

Figure 8:
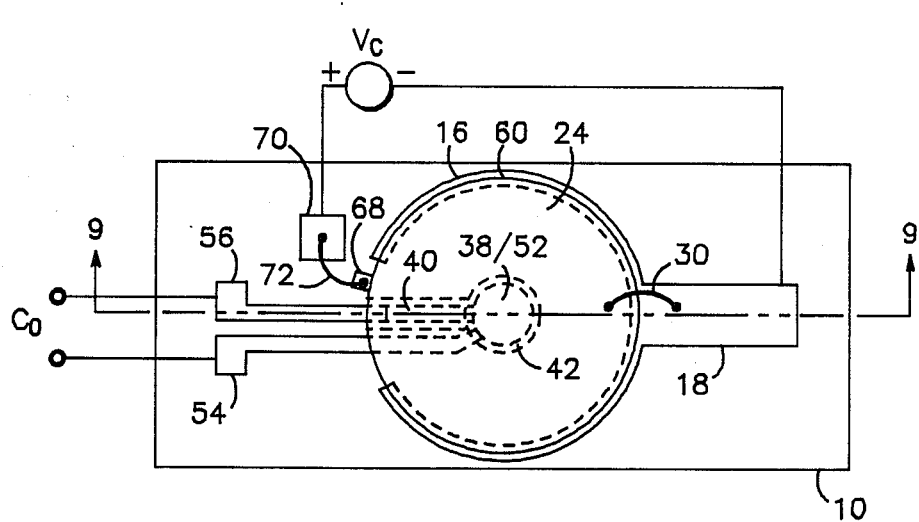
FIG. 8 is a top view of the preferred four terminal bimorphic embodiment of the present invention wherein the capacitance control voltage $V_c$ and the output capacitance $C_o$ are illustrated schematically.
Figure 9:
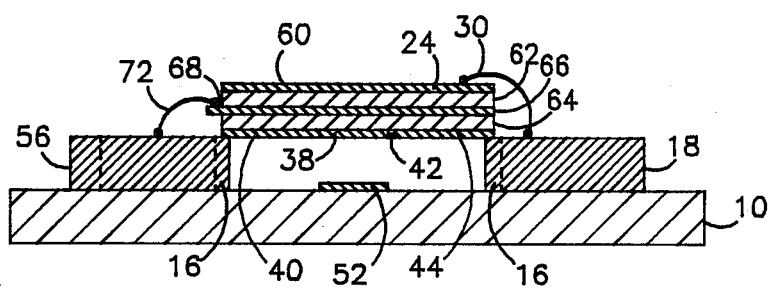
FIG. 9 is a sectional view of the preferred four terminal bimorphic embodiment as seen along line 9—9 of FIG. 8.

FIGS. 8 and 9 illustrate the preferred four terminal bimorphic embodiment of the present invention. First capacitor plate 52 with attached terminal 54, ridge 16 with attached terminal 18, and terminals 56 and 70 are formed on the surface of substrate 10 as previously described. In this embodiment, bimorph piezoelectric element 60 has a first capacitor plate 38 with an attached lead 40, insulating area 42, and control plate 44 formed on its lower surface as depicted in FIG. 3. As previously described, control plate 44 is attached to ridge 16 and terminal 40 is attached to terminal 56. Flywire 72 is connected between tab 68 and terminal 70 while flywire 30 is connected between upper control plate 24 and terminal 18. In this embodiment, the variable capacitance $C_o$ appears across terminals 54 and 56 while the control voltage is applied across terminal 70 and 18. As before, with the appropriate polarity of control voltage $V_c$, piezoelectric element 60 flexes towards substrate 10, decreasing the distance between capacitor plates 38 and 52 and thereby increasing the capacitance. If the opposite polarity is applied between terminals 70 and 18, piezoelectric element 60 flexes away from substrate 10, increasing the distance between capacitor plates 38 and 52, and thereby decreasing the capacitance.

In all embodiments of the invention, it is preferred that lower capacitor plate 12 or 52 be coated with a dielectric material. This dielectric material is preferably a low temperature glass for thick film processes, or about 1 micron of sputtered or evaporated $SiO_2$ for thin film processes. A sprayed on polyimide film is also suitable as are most dielectric materials well known in the hybrid microelectronic circuit processing art. In the alternative, either the upper capacitor plate 22 or 38, or both upper and lower plates can be coated with the dielectric material. If a thick dielectric material is used, the distance between the upper surface of ridge 16 and the upper surface of the lower capacitor plate 12 or 52 should be adjusted accordingly. To improve the Q of the capacitor, it is preferred that both the lower capacitor plate 12 or 52 and the upper capacitor plate 22 or 38 be formed from a highly conductive material, such as copper, silver, or gold.

In all embodiments, the diameter of the plates and the spacing between the plates depend upon the desired capacitance and these dimensions are chosen according to well known formulas. In a typical design according to FIGS. 1 and 2, with a wafer 20 and upper capacitor plate 22 diameter of 900 mils, a lower capacitor plate 12 diameter of 500 mils, a ridge 16 inside diameter of 700 mils, and a capacitor plate separation of 3 mils, a piezoelectric capacitor manufactured with thin film hybrid microelectronic circuit technology has a capacitance range of 14 to 28 pico-Farads.

I claim:

1. A method of constructing an electrically variable piezoelectric hybrid microelectronic circuit capacitor, comprising the steps of:

forming a first capacitor plate on a surface of a substrate;

forming a ridge on said surface of said substrate by a hybrid microelectronic circuit manufacturing process, whereby the upper surface of said ridge is positioned a predetermined distance above said first capacitor plate;

forming a second capacitor plate on a first surface of a piezoelectric wafer;

forming a first control plate on a second surface of said piezoelectric wafer;

placing said piezoelectric wafer on said ridge;

applying a force substantially at the center of said piezoelectric wafer, thereby causing said piezoelectric wafer to arch; and bonding said piezoelectric wafer to said ridge whereby said piezoelectric wafer maintains an arched shape when said force is removed.

2. The method of claim 1, further comprising the step of applying a dielectric material over the surface of one of said capacitor plates.

3. The method of claim 1, wherein said step of forming said ridge includes the step of tooling said ridge in said substrate.

4. The method of claim 1, wherein said hybrid microelectronic circuit manufacturing process includes sputtering said ridge on said substrate.

5. The method of claim 1, wherein said hybrid microelectronic circuit manufacturing process includes vacuum depositing said ridge on said substrate.

6. The method of claim 1, wherein said hybrid microelectronic circuit manufacturing process includes electroplating said ridge on said substrate.

7. The method of claim 1, wherein said hybrid microelectronic circuit manufacturing process includes screening said ridge on said substrate.

8. The method of claim 1, wherein said hybrid microelectronic circuit manufacturing process includes bonding said ridge to said substrate, wherein said ridge is a preformed glass ring.

9. The method of claim 1, further comprising the step of forming a second control plate on said first surface of said piezoelectric wafer.

* * * * *